United States Patent
Tamura

(10) Patent No.: US 8,423,688 B2
(45) Date of Patent: Apr. 16, 2013

(54) MULTI-THREAD FILE INPUT AND OUTPUT SYSTEM AND MULTI-THREAD FILE INPUT AND OUTPUT PROGRAM

(75) Inventor: Mineyuki Tamura, Tokyo (JP)

(73) Assignee: Hitachi Systems, Ltd., Tokyo (JP)

( * ) Notice: Subject to any disclaimer, the term of this patent is extended or adjusted under 35 U.S.C. 154(b) by 152 days.

(21) Appl. No.: 13/173,428

(22) Filed: Jun. 30, 2011

(65) Prior Publication Data
US 2012/0254485 A1    Oct. 4, 2012

(30) Foreign Application Priority Data

Mar. 29, 2011    (JP) .................................. 2011-71499

(51) Int. Cl.
*G06F 13/00*    (2006.01)
*G06F 15/16*    (2006.01)

(52) U.S. Cl.
USPC ............... 710/33; 710/52; 709/232; 718/107

(58) Field of Classification Search ............. 710/29–35, 710/52–57; 709/232; 718/107
See application file for complete search history.

(56) References Cited

U.S. PATENT DOCUMENTS

| 5,572,590 | A | * | 11/1996 | Chess ............................. 726/22 |
| 5,646,866 | A | * | 7/1997 | Coelho et al. ................. 715/716 |
| 5,809,527 | A | * | 9/1998 | Cooper et al. ................ 711/133 |
| 5,913,059 | A | * | 6/1999 | Torii ............................. 718/104 |
| 6,029,189 | A | * | 2/2000 | Ishida et al. ................... 718/105 |
| 6,701,373 | B1 | * | 3/2004 | Sakazawa et al. ............. 709/232 |
| 7,340,764 | B2 | * | 3/2008 | Kubota et al. .................... 725/90 |
| 2003/0172201 | A1 | * | 9/2003 | Hatae et al. ....................... 710/8 |
| 2008/0209572 | A1 | * | 8/2008 | Kano et al. ...................... 726/28 |

FOREIGN PATENT DOCUMENTS

| JP | 8-305643 | 11/1996 |
| JP | 2005-11119 | 1/2005 |

* cited by examiner

*Primary Examiner* — Christopher B Shin
(74) *Attorney, Agent, or Firm* — Antonelli, Terry, Stout & Kraus, LLP.

(57) ABSTRACT

A configuration performing processing of dividing a file into a plurality of pieces and transmitting the same even when a size of the file is large in transfer of files (input/output) between computers on a network is provided. A multi-thread file input/output system includes a first module performing processing of reading data from an input file, dividing the data into a plurality of pieces, and transmitting the plurality of pieces to a network by multi-thread processing in a transmitter computer; and a second module performing processing of receiving the plurality of pieces from the network and integrating and writing the same to an output file 5 in a receiver computer.

8 Claims, 7 Drawing Sheets

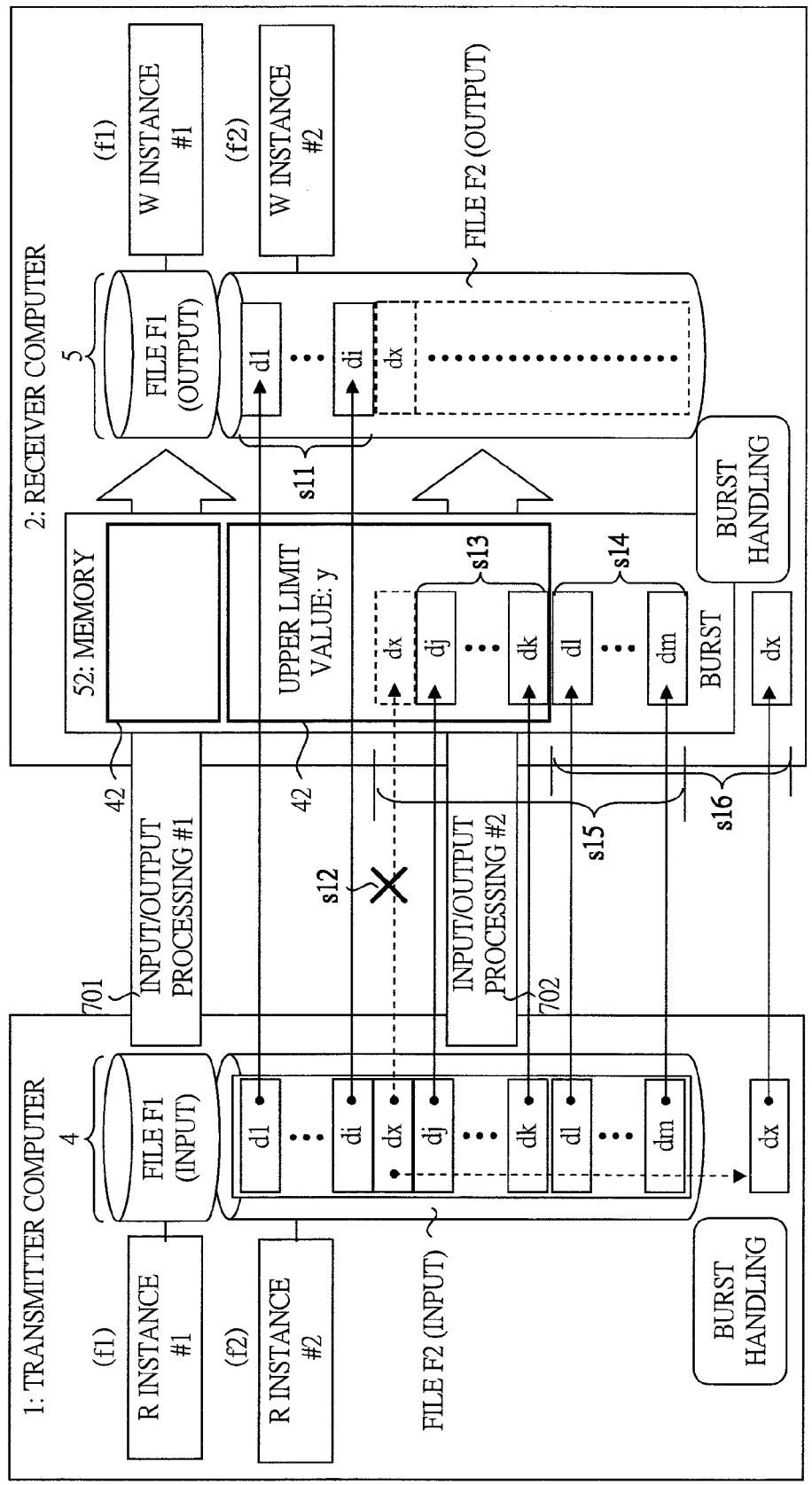

MULTI-THREAD FILE INPUT AND OUTPUT SYSTEM AND MULTI-THREAD FILE INPUT AND OUTPUT PROGRAM

CROSS-REFERENCE TO RELATED APPLICATION

The present application claims priority from Japanese Patent Application No. 2011-71499 filed on Mar. 29, 2011, the content of which is hereby incorporated by reference into this application.

TECHNICAL FIELD OF THE INVENTION

The present invention relates to a technology of file (data) transfer (input and output) in a communication network such as the Internet. More particularly, the present invention relates to multi-thread processing.

BACKGROUND OF THE INVENTION

As file transfer in the Internet etc., for example, file transfer processing using a particular protocol such as HTTP/FTP etc. among clients and servers is performed. However, when a file with a large size (capacity) has to be transferred, as protocols such as HTTP are not originally a protocol for transferring files, there are problems of a too long processing time (processing efficiency) etc.

When transferring a file with a large size, a possible way is dividing the file into a plurality of parts and transferring the parts. For example, the client terminal side reads a target file and divides it into a plurality of pieces (fragments) and transfers (transmits) each piece to a server via a network by HTTP etc. The server side receives each of the plurality of pieces and composes the original one file and stores the same. However, delay or loss of individual data is prone to occur in the Internet, and thus retry/resend is sometimes necessary when transferring a plurality of pieces of a file as described above due to the order of reception of the pieces being out of order or loss of the pieces. Therefore, when transferring the file by dividing it, there is also a problem in processing efficiency, etc.

As related art related to the file transfer described above, there are Japanese Patent Application Laid-Open Publication No. 2005-011119 (Patent Document 1; about a method of data transfer) and Japanese Patent Application Laid-Open Publication No. 8-305643 (Patent Document 2; about a method of file transfer), for example.

Patent Document 1 describes that, aiming for a method of data transfer not placing burden on a cache function on a communication path, for example, after a browser automatically compresses a file, the file is divided to a specified size and transmitted to a Web site in separate sessions per divided file, and the Web site extracts the transmitted file after integrating the same.

Patent Document 2 describes determining a number of dividing files and a number of TCP sessions based on a window size of a TCP protocol, a round-trip delay time and a line speed of a network, and dividing the file by the number and also establishing a plurality of TCP sessions for data transfer, thereby performing a data transfer.

SUMMARY OF THE INVENTION

As described above, in the back ground technology including the related art, there are problems in processing efficiency in transferring files (input/output) on a network (the Internet) etc.

In view of the foregoing, a main preferred aim of the present invention is to provide a technology related to file transfer (input/output) among computers on a network (the Internet) and particularly capable of improving processing efficiency as a whole in a configuration of performing processing of dividing a file into a plurality of pieces and transferring the same even when a size of the target file is large.

To achieve the above-mentioned preferred aim, a typical embodiment of the present invention is an information processing system and program performing processing of file transfer (input/output) among computers on a network (the Internet) and is a configuration having a function of performing processing of dividing a file into a plurality of pieces and transferring the same even when a size of the target file is large, having the configuration described below.

In the system ("multi-thread file input/output (transfer) system") of the present embodiment, a multi-thread structure in a processing flow of input (read), division, transfer (transmission-reception), integration, output (write) of a file in processing including file (data) transfer (input/output) between a first computer (e.g., client terminal) and a second computer (e.g., server). That is, for processing including transfer of a target file, the configuration has a function/processing portion (multi-thread file input/output module) which performs a processing regarding data of each of the plurality of pieces made by division in parallel by multi-thread. In this manner, processing efficiency of file transfer is improved.

The first and second computers have a file input/output module which performs corresponding information processing (e.g., software program processing) handled by a transmitting (input) side and a receiving (output) side. For example, the first computer on a side for transmitting a file has a first module (processing portion performing file input (read), division, piece data transmission etc.) for transmission, and the second computer on a side receiving the file has a second module (processing portion performing piece data reception, integration (reproduction), file output (write) etc.) for reception.

The multi-thread file input/output system of the present embodiment is a system which performs input/output processing of a file between a first computer and a second computer on a network, the system including: a first module performing processing of reading and dividing data from a file of an input source and transmitting the file as a plurality of pieces to the network by multi-thread processing in the first computer on a side of transmitting the file; and a second module performing processing of receiving and integrating the plurality of pieces from the network and writing the file to a file of an output destination by multi-thread processing in the second computer on a side of receiving the file. The first module processes transmission of each of the plurality of pieces made by the division by each of transmit threads to be allocated in simultaneous parallel processing, and the second module processes reception of each of the plurality of pieces made by the division by each of receive threads to be allocated in simultaneous parallel processing. The first module attaches an ID of transmission of the file and information of a relative position from a head position of the file to a piece to be transmitted. The second module performs write processing of the plurality of pieces to the file of the output destination in order from a head position while confirming until which relative position the pieces have been written in the file of the output destination from a head position, and also storing the receiving pieces to a receive buffer inside the second computer when necessary.

According to the configuration described above, even when an order (A) of transmitting a plurality of pieces from the first module and an order (B) of receiving the plurality of pieces are different, transfer of the file is efficiently achieved.

According to the typical embodiment of the present invention, a configuration related to file transfer (input/output) among computers on a network (the Internet) and performing processing of transferring a file by dividing it into a plurality of pieces in multi-thread processing, particularly, even when a size of the target file is large.

BRIEF DESCRIPTIONS OF THE DRAWINGS

FIG. 7 is a diagram illustrating an example of function and processing of the system according to the embodiment.

DESCRIPTIONS OF THE PREFERRED EMBODIMENTS

Hereinafter, embodiments of the present invention will be described in detail with reference to the accompanying drawings. Note that components having the same function are denoted by the same reference symbols throughout the drawings for describing the embodiment, and the repetitive description thereof will be omitted. Note that the symbols for description will be suitably used as follows. R: read, W: write, F: file, d: piece (fragment), T: transmit thread, U: receive thread, A: output position (relative position from the head of a file), etc.

<Feature Etc.>

Features of the present invention and an embodiment and so forth will be described hereinafter.

Figure 3:
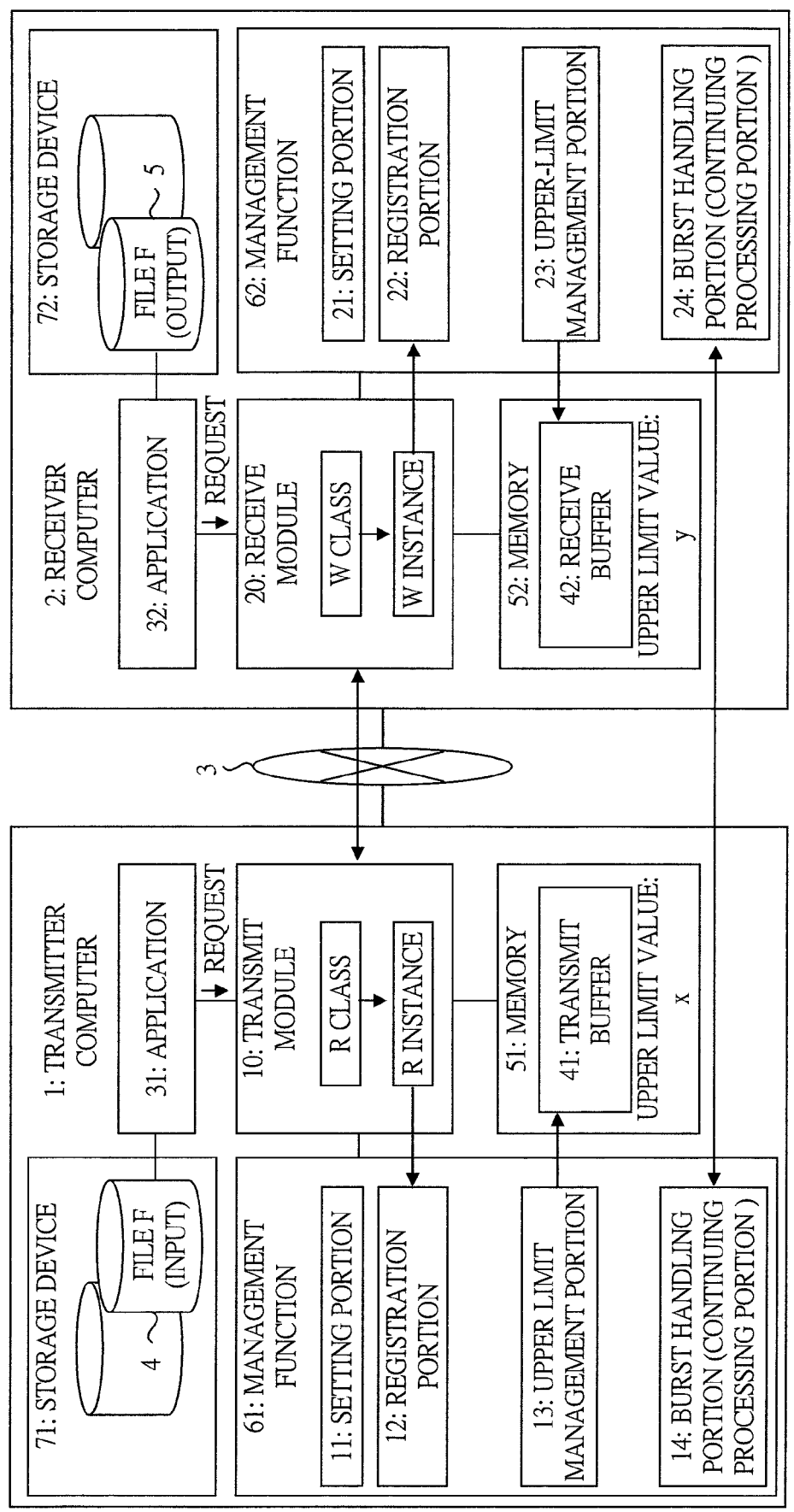
FIG. 3 is a diagram illustrating an example of a function configuration according to the embodiment.

(1: Outline) In a system (multi-thread file input/output system etc.) of the present embodiment, an improvement in transfer processing efficiency is achieved by performing processing of multi-thread file transfer (input/output) among computers (e.g., between a client terminal and a server) of a communication network. A multi-thread file input/output module 30 (FIG. 1 etc.) of the present system is configured including a transmit module (first module) 10 provided in a transmitter computer 1 (first computer, for example, a client terminal) and a receive module (second module) 20 provided in a receiver computer 2 (second computer, for example, a server). The present module 30 is also used in file input/output of any of the client terminal side and the server side, for example. In the following, the first module 10 corresponds to R class-R instance, and the second module 20 corresponds to W class-W instance (FIG. 3). Note that R denotes Reader (read, input) and W denotes Writer (write, output). Wordings of class and instance are based on the terminology of information processing field.

Figure 1:
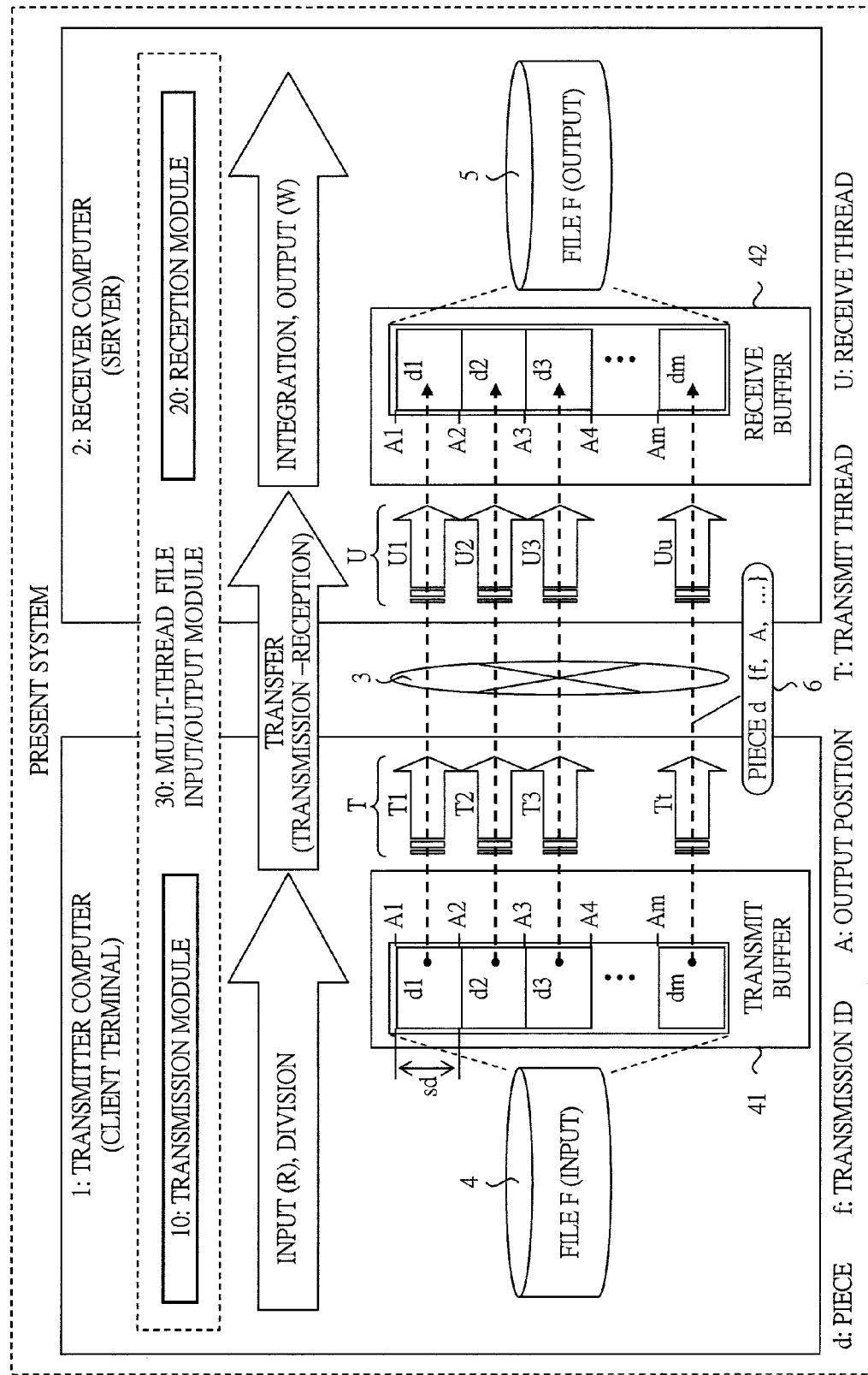
FIG. 1 is a diagram illustrating an outline 1 of a system (an information processing system including a multi-thread file input/output module (multi-thread file input/output system)) according to an embodiment of the present invention.

Note that the configuration of FIG. 1 is an example of having the transmit module 10 on a client terminal side and a receive module 20 on the server side and transferring a file from the client terminal to the server (upload). In an opposite manner, a configuration including the receive module 20 on the client terminal side and the transmit module 10 on the server side and transferring a file from the server to the client terminal (download) can be used. When the configuration includes both modules (10, 20) in both of the client terminal and the server, the configuration can do both input and output of the file.

(2: Operation) The present module 30 performs processing corresponding to a file input/output request generated from each thread of the multi-thread related to the file transfer processing during an exclusive control. By an input/output request issued by each thread, a relative position (A) from a head of the file is specified. The module 30 controls an order of input/output (of a group of pieces d of a file F) with reference to the specified relative position (A). When the processing request from the thread is different from an actual file processing order, the module stacks the pieces d in a memory (buffer) and fixes the order.

For example, when dividing a file F having a 500-bite size into pieces d having a 100-bite size each and outputting the same, a number of generated output requests is five {[output position 0], [output position 100], [output position 200], [output position 300], [output position 400]} (output position (A)=relative position from a head of the file F). For example, when the piece of [output position 200] is requested prior to the piece of [output position 100], the piece of [output position 200] is stacked in the memory (buffer) and outputted at a timing when the piece of [output position 100] is output.

(3: Management Function) The module 30 has a management function (FIG. 3; 61, 62) assuming a situation of carrying out input and output of a plurality of files in a process of an application.

The application using the module 30 (FIG. 3; 31, 32) can unify the management of file input/output in the process of the application by registering the R class and W instance created for file transfer processing to the management function (61, 62). In this manner, upper-limit management of memory usage amount and deletion of unnecessary instance, etc. can be performed in a lump.

(4: Upper limit of memory usage amount and burst) In processing of stacking the pieces d in the memory (particularly, a receive buffer 42 in a memory 52) in a computer (particularly, the receiver computer 2), when it reaches an upper limit per unit of process managed by the management function or an upper limit of a memory per file, the state becomes a predetermined state (it will be called "burst" as a matter of description). Following the burst state (process interrupted), all of the transfer of the file (piece reception etc.) is in error. The system has a function of reprocessing (continuous processing) of file transfer as a function capable of handling the burst state. When the state becomes the burst state, the system (receive module 20) can continue the file transfer processing by calling a predetermined method (the function described above).

(5: File output operation of the management function) As one management function, the file output processing (on the receiver side) does not directly write data of piece d to a file of the output destination (5 in FIG. 1) but a method (related art) may be used such that a temporary folder (temporary file) is provided in between and outputs GUID (unique identification information) as a file name and moves the file to the output destination (5 in FIG. 1) at a timing when all outputs are finished. There is a possibility that the file output processing carried out by the management function takes a long time, and thus the method described above is effective as a countermeasure of avoiding reference of the file (5 in FIG. 1) in the midst of output from other applications. As the move of the output file in the temporary folder is fast when it is carried out in the same drive (only index replacement), the temporary folder described above and the file of output destination (5 in FIG. 1) is preferably set in the same drive.

Embodiment

Figure 2:
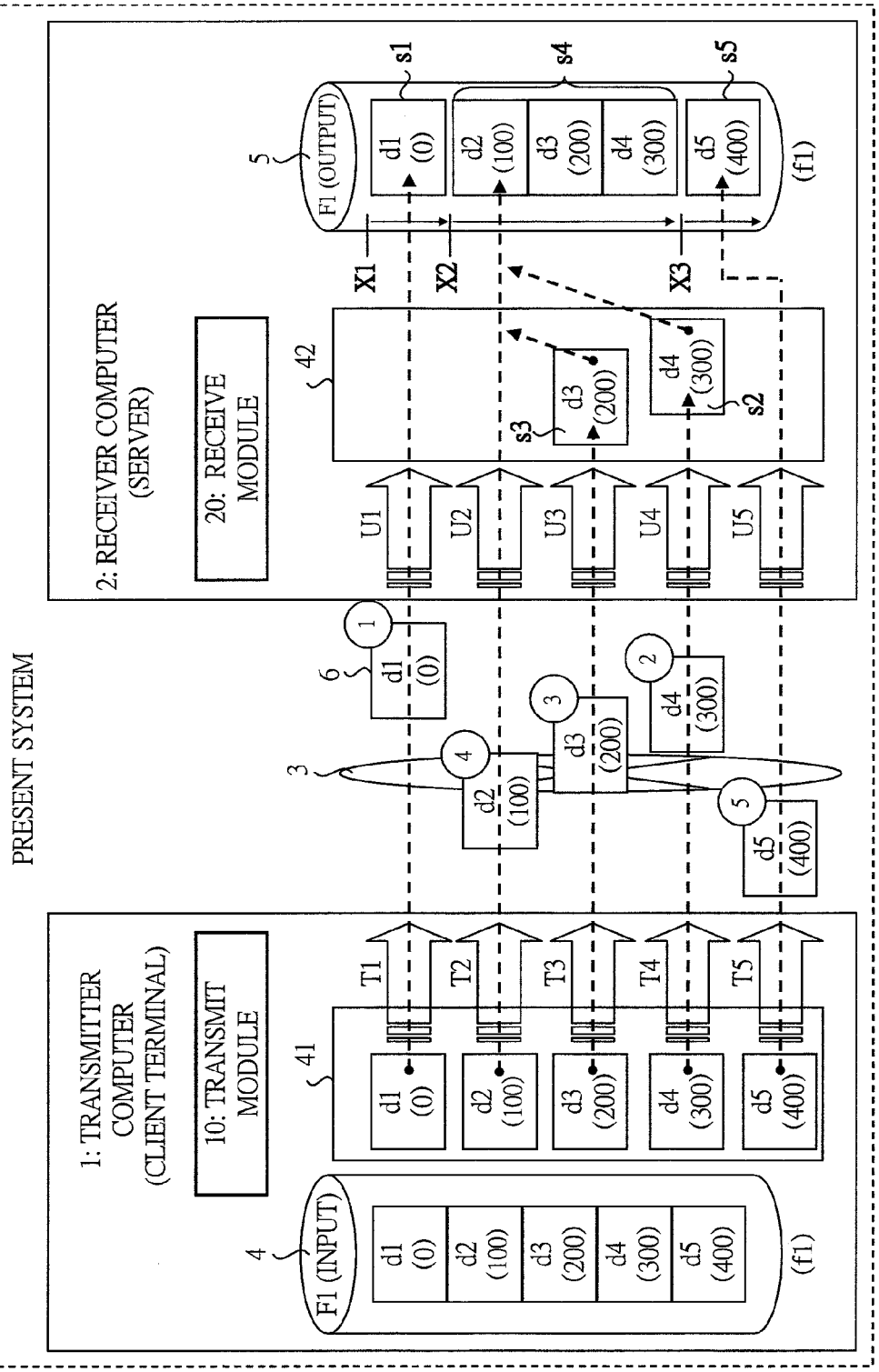
FIG. 2 is a diagram illustrating an outline 2 of the system according to the embodiment.
Figure 4:
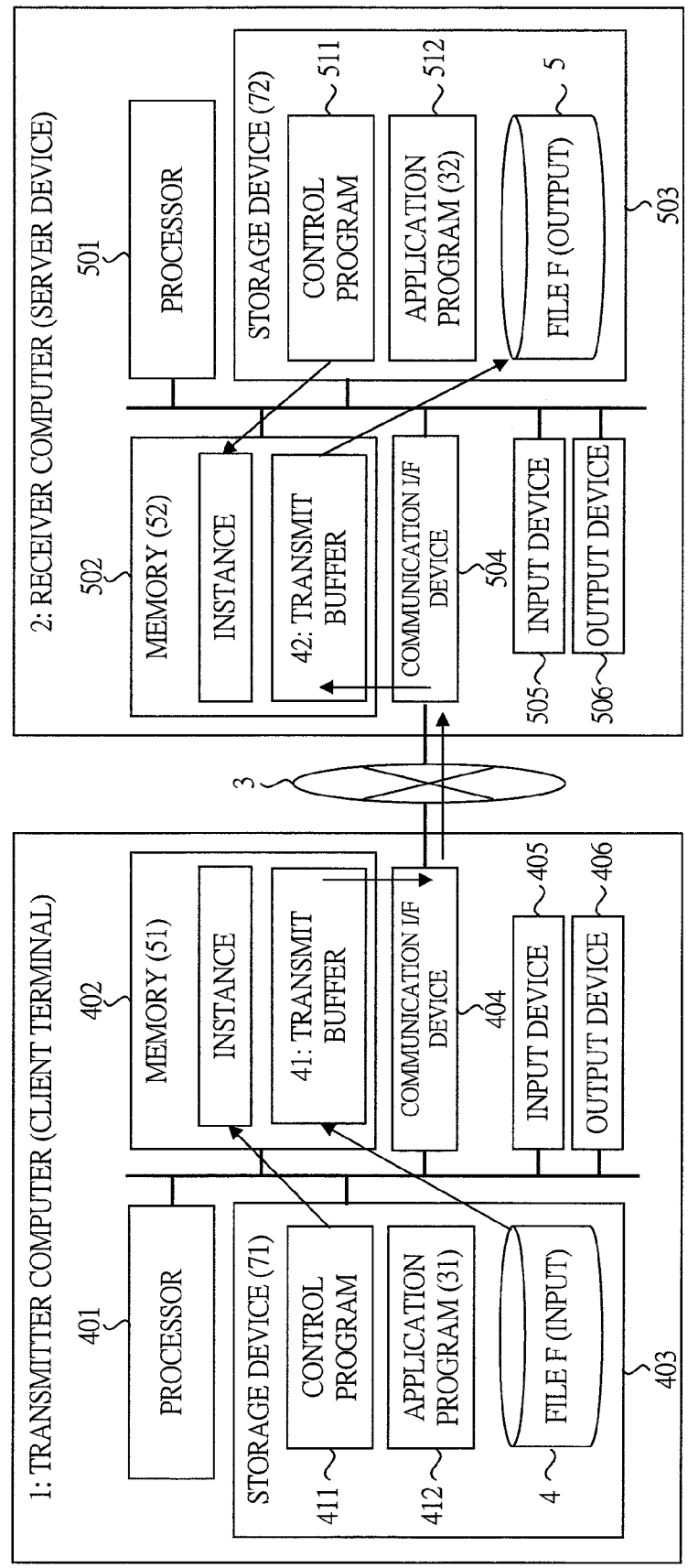
FIG. 4 is a diagram illustrating a configuration example of hardware/software of the system according to the embodiment.
Figure 5:
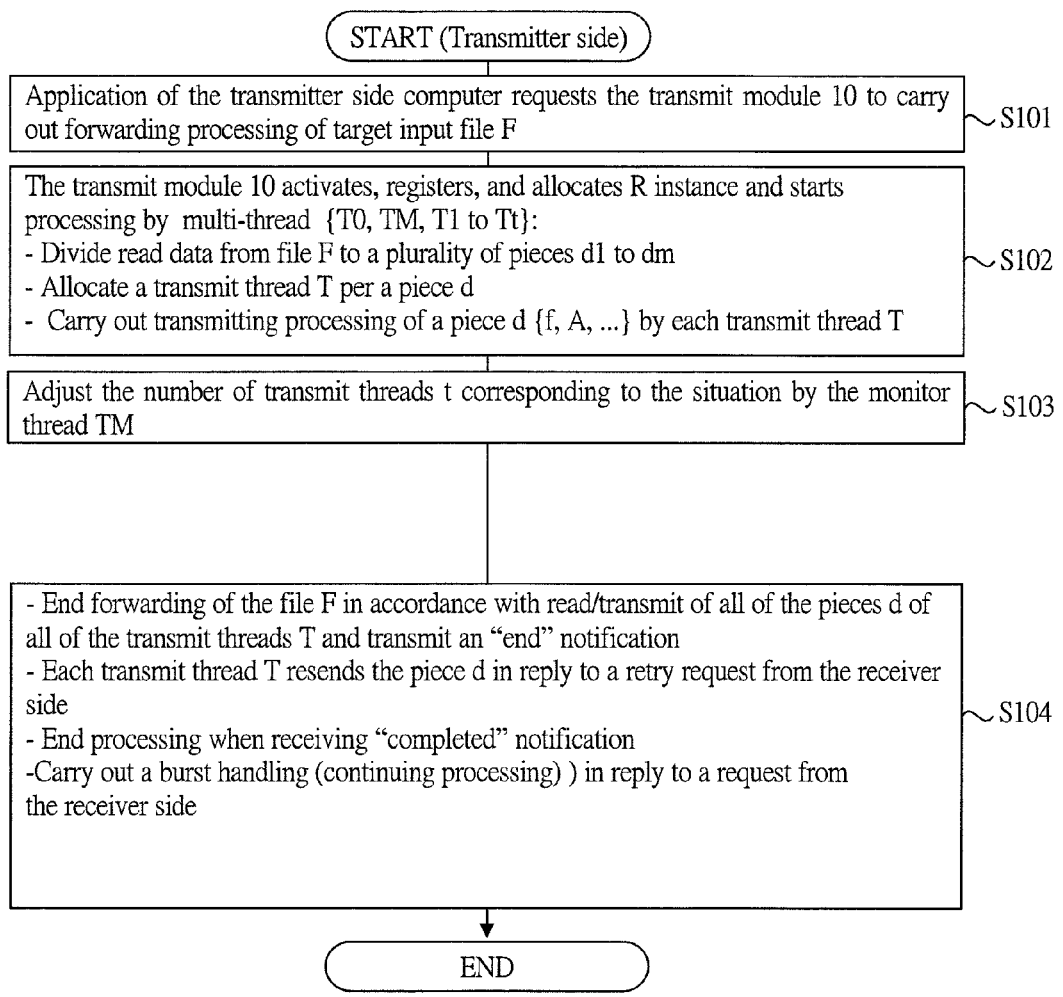
FIG. 5 is a diagram illustrating processing of a transmit module as main processing 1 of the system according to the embodiment.
Figure 6:
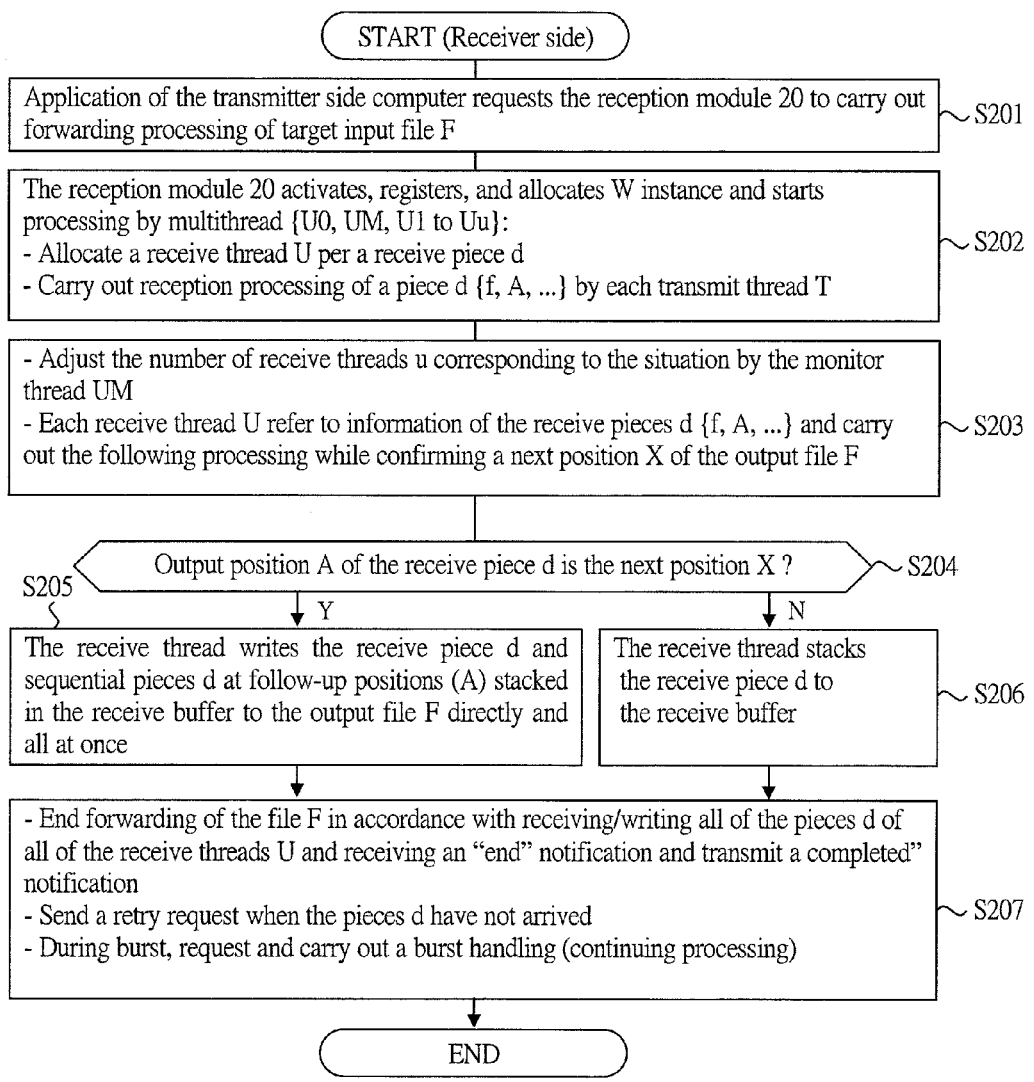
FIG. 6 is a diagram illustrating processing of a receive module as main processing 2 of the system according to the embodiment.

Hereinafter, with reference to FIGS. 1 to 7, a system (the information processing system (multi-thread file input/output system) including a multi-thread file input/output module) according to the present embodiment will be described. FIGS. 1 and 2 illustrate outline of the present embodiment and so forth in an easy-to-understand manner. FIGS. 3 and 4 illustrate a function configuration, a mounting configuration, a relationship of respective elements, etc. FIGS. 5 and 6 illustrate main processing. FIG. 7 illustrates an applicable function and an example of processing etc.

[Outline 1]

With reference to FIG. 1, an outline 1 (not until considering an order of the plurality of pieces d) of the present embodiment will be described.

The system as a whole has a configuration in which the transmitter computer 1 and the receiver computer 2 are connected via a network (the Internet) 3. The transmitter computer 1 is, for example, a client terminal of a user, and the receiver computer 2 is, for example, a server (server apparatus). The transmitter computer 1 is on a transmitting (inputting) side of a file F (4) of a transfer (input/output) target and the receiver computer 2 is on a receiving (outputting) side of the file F (5).

And, the present system has the multi-thread file input/output module 30 {transmit module 10, receive module 20} which performs corresponding information processing (achieved by software program processing) by the transmitter computer 1 and the receiver computer 2. The transmitter computer 1 has the transmit module 10 and the receiver computer 2 has the receive module 20. The transmit module 10 is a processing portion which performs processing of input (read), division, transmission of the pieces d, etc. of data of the file 5 of the input source by multi-thread. The receive module 20 is a processing portion which performs processing of reception of pieces d, integration, output (write) etc. of data to the file 5 of the output source by multi-thread. While each processing of the first module 10 and the second module 20 is independent to each other, the structure automatically achieves processings corresponding and cooperating between the first module 10 and the second module 20. While it is omitted in FIG. 1, applications etc. (FIG. 3) operating in each of the computers (1, 2) perform processings of predetermined transfer of the file F using the module 30 (10, 20).

As illustrated in FIG. 1, when the transmit module 10 is provided on the client terminal (1) side and the receive module 20 is provided to the server (2) side, transfer of the file F from the client to the server (upload) can be carried out. Conversely, when the receive module 20 is provided on the client terminal side and the transfer module 10 is provided to the server side, transfer of the file F from the server to the client (download) can be carried out. Also, when both of the modules (10, 20) are provided to each of the client and server, transfer of both directions can be carried out. As the basic structures of the transfers are the same, using the configuration as illustrated in FIG. 1 will be described hereinafter.

The file F (input file) 4 denotes an input source, and the file 5 (output file) 5 denotes an output destination. An aim of the processing of the module 30 is to finish writing after transferring all data of the input file 4 to the output file 5. Note that the input file 4 and the output file 5 are, for example, data files of drives specified by specific paths (addresses).

By processing of the transmitter computer 1 (transmit module 10), the file 4 on the transmitting side is divided into a plurality of pieces d (e.g., d1 to dm) (stored in the transmit buffer 41). A size of the whole file F is denoted by sF, and a size of division (piece size) is denoted by sd. "m" means a number of divisions of the file F (number of pieces). Also, regarding an output position A (relative position from a head of the file F), output positions A of pieces d1 to dm are A1 to Am, respectively. For example, when sF=500 and sd=100 (m=5), and output positions A of pieces d1 to d5 are {A1=0, A2=100, A3=200, A4=300, A5=400}.

The transmit module 10 activates and allocates a plurality of threads (transmit threads) T for transferring (transmitting) the file F (pieces d1 to dm). For example, the transmit threads are T1 to Tt. "t" means a number of transmit threads. While "m" and "t" are independent and variable values depending on the situation (will be described later), in the example in FIG. 1, simply m=t (the pieces d and the transmit threads T are in a one-on-one relationship).

Each of the pieces d are transferred (transmitted) from the transmitting side to the receiving side by each of the transmit threads T via the network 3. By an input/output request issued by each of the transmit threads T, the relative positions A from the head of the file F etc. are specified regarding the pieces d. The module 30 (10, 20) controls an order of input/output of the plurality of pieces d with reference to the specified relative positions (A).

To data 6 of each of the pieces d transferred on the network 3, transmission ID (denoted by "f"), output position A etc. per target file F are attached as information (for example, described in a header). The transmission ID (f) is an ID attached per transmission (transfer) processing of the target file F (4) (unique identification information). Processings with the same "transmission ID" are regarded as the same file transfer processing. The output position A is information indicating a relative position from the head of the file F. Also, various information items such as the file size sF, the piece size sd etc. may be attached.

Note that, in accordance with situations etc. of the transmitting side (1, 10), network 3, and receiving side (2, 20), the order (order of input/output) of the plurality of pieces d in the above-described file transfer processing may be varied (FIG. 2).

Meanwhile, the receive module 20 of the receiver computer 2 activates and allocates a plurality of threads (receive threads) U for transferring (receiving) the file F (pieces d1 to dm). For example, the receive threads are U1 to Uu. "u" means a number of receive threads. While "u" is independent and variable as same as "m" and "t", in the example in FIG. 1, it is simply t=u. Since the corresponding relationship of the transmit threads T and the receive threads U is determined by a dynamic allocation, the relationship is not in a one-on-one manner (multi-threads being independent to each other).

The receive module 20 performs processing by the receive thread U in accordance with reception of data of each of the pieces d via the network 3. The receive module 20 controls an order of outputting the plurality of pieces d with reference to the relative positions (A). In accordance with the processing of the receive module 20, data of each of the plurality of pieces of d1 to dm is stacked in the receive buffer 42 based on information of the output positions A of the pieces d as necessary and the order of the plurality of pieces d is fixed and the data is integrated and written as the output file 5.

[Outline 2]

With reference to FIG. 2, following FIG. 1, an outline 2 of the present embodiment (until finishing the file transfer processing in consideration of the order of the plurality of pieces d) will be described.

In the example of FIG. 2, regarding transmitting processing of the file F (4) having a transmission ID (f)=f1 and a file size (sF)=500, the plurality of pieces d1 to d5 with m=5 and sd=100 are subjected to transmitting processing by the transmit threads (T1 to T5) with t=5. A transmitting order (order A) of the pieces d at a timing of transmitting from the transmitter computer 1 is, for example, {d1, d2, d3, d4, d5} (in ascending order of the output positions A).

Depending on the situation of the network 3, the order of transfer of the plurality of pieces d is varied and an order (order B) at the timing of receiving by the receiver computer 2 is, for example, {d1, d4, d3, d2, d5}.

In the receive module 20, each of the plurality of receive threads U (for example, U1 to U4 with u=5) refers to information {f, A, etc.} about the data of the pieces d received by the receive threads U themselves, and, when the information is different from a processing order of the file F (e.g., the order A), the file is not output (written) to the target file F (5) (e.g., disk area) but is once stacked in the receive buffer 42. And, using the stack, the order of the plurality of pieces d is fixed. Particularly, by referring to the information of the output positions A, the order can be fixed.

Also, the receive module 20 manages to which relative position A (piece d) from the head the write has been finished or which relative position A (piece d) should be written next, and so forth as information. The information is regarded as "next position X". The first next position X1 is A=0.

Between the transmit module 10 and the receive module 20, processing in order of s1 to s5 is performed as follows.

(s1) First, by the first receive thread U1, the first piece d1 (A1=0) is received. As d1 follows the original order A and is a piece to be outputted (written) first to the file 5, d1 is not stacked in the receive buffer 42 but directly outputted (written) to a region of the file 5. At this timing, a next position X2 is a piece d2 at A2=100.

(s2) Next, it is assumed that a fourth receive thread U4 receives a fourth piece d4 (A4=300). In this case, the piece d4 is not at the next position X2 (=A2) and thus the piece d4 is stacked in the receive buffer 42.

(s3) Next, it is assumed that a third receive thread U3 receives a third piece d3 (A3=200). In this case, as the piece d3 is not at the next position X2 (=A2), the piece d3 is stacked in the receive buffer 42. Thus, the receive buffer 42 is in a state stacking d4 and d3.

(s4) Next, it is assumed that a second receive thread U2 receives a second piece d2 (A2=100). In this case, as the piece d2 is a piece corresponding to the next position X2 (=A2), the piece d2 is not stacked in the receive buffer 42 but directly outputted (written) to the area of the file 5. Herein, when there are pieces d (d3, d4) at positions (A) following the received piece d (d2), in the pieces d (d4, d3) being stacked in the receive buffer 42, the received piece d (d2) and the following pieces (d3, d4) are outputted (written) to the area of the file 5 together in a lump. That is, data of {d2, d3, d4} is written together from a position (X2=A2) after d1 which has been already written in s1. In this manner, d1 to d4 are already written in the file 5 in this state, and a next position X3 is A5.

(s5) Thereafter, it is assumed that a fifth receive thread U5 receives a fifth piece d5. In this case, as the piece d5 is a piece corresponding to the next position X3 (=A5), the piece d5 is not stacked in the receive buffer 42 but directly outputted (written) in the area of the file 5. In this manner, all of the pieces d1 to d5 are written in the target file F (5).

As described above, the receiver side (20) outputs, when a piece d at a position (A) following a piece d which has been already outputted comes, data of the pieces d is outputted (written) together with already-stacked data of the receive buffer 42. According to such a structure, even when the order of the plurality of pieces d is varied, the pieces d can be efficiently aligned. Thus, efficiency of output (write) processing to the target file F is improved.

[Basic Configuration]

FIG. 3 illustrates a basic function configuration of the present system. FIG. 4 illustrates a configuration example of corresponding hardware and software.

The transmitter computer 1 includes: an application 31; the input file (F) 4 which is a target to be transferred stored in a storage device 71; the transmit module 10 (including the management function 61); and a memory 51 to which the transmit buffer 41 is allocated, etc. The receiver computer 2 includes: an application 32; the output file (F) 5 which is a target to be transferred stored in the storage device 71; the receive module 20; and a memory 52 to which the receive buffer 42 is allocated, etc.

The application 31 is a program (process) which requests file transfer processing using the module 10 and forms an R instance using an R class of the transmit module 10. The application 31 calls the transmit module 10 (requesting processing) upon transfer of the file F to pass control. The same manner goes to the application 32 of the receiver side (20).

The module 30 includes, as classes (classes for generating an instance) related to multi-thread file input/output (transfer), a transmit class (R class) in the transmit module 10 and a receive class (W class) in the receive module 20. Instances for actual processings (R instance and W instance) are generated per file transfer processing unit, respectively.

The transmit module 10 is achieved by program processing and is operated by creating and allocating the R instance per file processing unit from the R class in response to a request of transferring (or read/input, transmission, etc.) the file F from the application 31. The transmit module 10 is registered in the management function 61 (registration portion 12). The R instance controls the multi-thread {T0, TM, T1 to Tt}.

The transmit module 20 is achieved by program processing and is operated by creating and allocating the W instance per file processing unit from the W class in response to a request of transferring (or read/input, transmission, etc.) the file F from the application 32. The transmit module 20 is registered in the management function 62 (registration portion 22). The R instance controls the multi-thread {U0, UM, U1 to Uu}.

The transmit module 10 allocates the transmit buffer 41 for the file transfer processing described above in the physical memory 51 of the transmitter computer 1. A size (capacity) of the transmit buffer 41 ensured in the memory 51 is a size depending on an upper limit value (x) to be set. The receive module 20 allocates the receive buffer 42 for the file transfer processing in the physical memory 52 of the receiver computer 2. A size (capacity) of the receive buffer 42 allocated in the memory 52 is a size depending on an upper limit value (y) to be set.

In FIG. 4, although not illustrated, both of the first and second computers (1 and 2) have a configuration capable of running multi-thread on an OS.

The transmitter computer 1 (client terminal) includes a processor 401; a memory 402; a storage device 403; a communication I/F device 404; an input device 405; an output device 406, etc. The processor 401 reads a code of an application program 412 from the storage device 403 to the memory 402 (51) and executes the same, thereby achieving a process of the application 31. Also, the processor 401 reads a code of a control program 411 from the storage device 403 to the memory 402 (51) and executes the same, thereby achieving a multi-thread processing including the R instance of the transmitting module 10. Moreover, data of the target input file 4 stored in the storage device 403 is read to the transmit buffer 41 of the memory 402 (51) and processed (T0).

The receiver computer 2 (server) includes: a processor 501, a memory 502; a storage device 503; a communication I/F device 504; an input device 505; an output device 506; etc. The processor 501 reads a code of an application program 512 from the storage device 503 such as a disk to the memory 502 (52) and executes the same, thereby achieving a process of the application 32. Also, the processor 501 reads a code of a control program 511 from the storage device 503 to the memory 502 (52) and executes the same, thereby achieving a multi-thread processing including the W instance of the receive module 20. Moreover, data stored in the receive buffer 42 of the memory 502 (52) is subjected to read processing in the target output file 5 stored in the storage device 503 (U0).

The transmit module 10 (each transmit thread T) subjects piece d data 6 to transmitting processing of the network 3 using the communication I/F device 404. The receive module 20 (each receive thread U) subjects piece d data 6 to receiving processing of the network 3 using the communication I/F device 504.

[Management Function]

In FIG. 3, the management function 61 is provided as a part of the transmit module 10. The management function 62 is provided as a part of the receive module 20. Note that the management functions 61 and 62 may be configured as separate modules. For example, a third module or the like for management and/or control may be added to upper side of the modules 10 and 20 (for example, management and/or control of transfer processing of a plurality of files).

The management function 61 of the transmitter side (10) includes: a setting portion 11; a registration portion 12; an upper-limit management portion 13; a burst handling portion 14; etc. The management function 62 of the receiver side (20) includes: a setting portion 21; a registration portion 22; an upper limit management portion 23; a burst handling portion 24; etc. In addition, the management function (61, 62) has processing functions such as clear of unnecessary data of the buffer (41, 42), batch erase of unnecessary instances, etc. Also, processing functions such as retry (resend) in network communication, which is an existing technology, etc. is provided.

The setting portions 11 and 21 perform setting processings of various variable setting values mentioned above (e.g., m, sd, x, t0, etc. of the transmitter side), respectively.

The registration portions 12 and 22 register and manage information of a situation of creating (activating)/allocating an instance from a class in response to a request from the applications (31, 32), respectively.

The upper-limit management portions 13 and 23 manage upper limits of usage of the memories 51 and 52 related to the file transfer processing. That is, the upper-limit management portions 13 and 23 manage upper limit values (x, y) of sizes of the buffers (41, 42) allocated in the memories 51 and 52. The upper limit values (x, y) can be set from the setting portions 11 and 21.

The burst handling portions 14 and 24 perform handling processing when a burst occurs on the receiver side (20), respectively. As the handling processing, functions of, for example, continuing processing are included (will be described later). On the transmitter side (10), when the transmit buffer 41 reaches an upper limit value x by storing the piece d data, the file transfer processing is suspended. The receiver side (20) activates the burst handling processing when the receive buffer 42 exceeds the upper limit value y by storing the piece d data, recognizing this situation as "burst state" (using the burst handling portion 24).

[Processing Sequence]

Main processing of the present system will be described with reference to FIGS. 5 and 6. Processings on the transmitter side (1, 10) (FIG. 5) and processings of the receiver side (2, 20) (FIG. 6) are independent processings, and have processing algorithms of corresponding predetermined contents. In each of processings of a plurality of threads, processing of own thread is carried out in accordance with a predetermined processing algorithm (control information communication in synchronization between the transmitter side and the receiver side is unnecessary). In this manner, the structure achieves the file transfer processing in an overall and automatic manner. Note that, for example, in S102 and S202, transfer of the piece d data 6 etc. is performed between the transmitter side (10) and receiver side (20). In addition, in 5104 and 5207, transfer of the piece d data 6 etc. is performed between the transmitter side (10) and the receiver side (20).

(S101) In FIG. 5, the application 31 of the transmitter computer 1 (its process) requests transfer processing of the target input file 4 to the transmit module 10.

(S102) The transmit module 10 generates and registers the R instance for processing the file 4, and starts processing (described later) by multi-thread {T0, TM, T1 to Tt} to be allocated. Also, a transmission ID (f) for discriminating the file transfer processing is set. The transmit module 10 subjects the multi-thread {T0, TM, T1 to Tt} to exclusion control. Note that it is not particularly necessary to start any processing on the receiver side (20) at the timing of S102.

By the file read thread T0, data items (data per divided piece size sd) are sequentially read and stored (registered) as a plurality of pieces d (d1 to dm) to the transmit buffer 41.

The transmit thread T (T1 to Tt) is allocated per the transmitted piece d (d1 to dm). An initial number of the transmit thread T to be allocated is t0. Each transmit thread T extracts one piece of the piece d data from the transmit buffer 41 and adds necessary information {f, A, . . . } to form the piece d data 6, and subjects the piece d data 6 to transmitting processing of the network 3. In the transmitting processing of the piece d data 6 by the transmit thread T, as information to be added to the piece d itself, the transmission ID (f) and the output position A are included. When transmission of one piece of d is finished, the transmit thread T can shift to work on transmission of another piece d when there is another piece d (when m>t).

(S103) The transmit module 10 suitably adjusts a transmit thread number (t) while statuses of the plurality of transmit threads T1 to Tt are being monitored by the monitor thread TM.

(S104) The transmitter side (10) reads and transmits all the pieces d (d1 to dm) of the target file F (4) by all the transmit threads T and ends transfer of the file F. When the transmission of all of the pieces d, the transmitter side (10) transmits an "end" notification to the receiver side (20). In the "end" notification, information of transmission ID (f) corresponding to the file F and information of a file name etc. of the file F are specified and added.

Also, when receiving a "completed" notification from the receiver side (20), the transmitter side (10) finishes the present file transfer processing.

Also, when receiving a retry request from the receiver side (20), the transmitter side (10) resends the requested and specified piece d data to the receiver side (20) by corresponding one of the transmit threads T.

Also, when receiving a request of a burst handling (continuing processing) from the receiver side (20), the transmitter side (10) transmits a requested and specified piece d data group to the receiver side (20) by a transmit thread T group using the burst handling portion 14.

(S201) In FIG. 6, the application 32 of the receiver computer 2 requests for transfer processing of the target output file (F) 5 to the receive module 20.

(S202) The receive module 20 creates and registers the W instance for processing the file 5 in response to the request and starts processing (described later) by the multi-thread {U0, UM, U1 to Uu} to be allocated. The receive module 20 subjects the multi-thread {U0, UM, U1 to Uu} to exclusion control.

The receiver side (20) allocates the receive threads U (U1 to Uu) per the received pieces d when receiving the pieces d from the transmitter side (10). By each of the receive threads U (U1 to Un), data 6 (to which information {f, A, ... } is attached) of each of the pieces d (d1 to dm) is subjected to receiving processing. By the file write thread U0, data of the plurality of pieces d is integrated and subjected to writing processing to the output file 5. By using U0, the piece d data is controlled to be continuously written in order from the next position X of the file 5. More details will be described below as S203 and the following.

(S203) The receive module 20 suitably adjust the number of receive threads (u) monitoring the status of the receive threads U1 to Uu by the monitor thread UM (in the same manner as the transmitter side (10)).

Each of the receive threads U refer to the attached information {f, A, ... } of the received pieces d to confirm the corresponding file F, the output position A of the piece d, the size sd etc. Those having the same transmission ID (f) is handled as the same file transfer processing. Here, the receive module 20 performs processing corresponding to the following threading while managing and confirming information of the next position X for writing the piece d data to the target (output destination) file 5 continuously in order from a head position.

(S204) Each of the receive threads U determines whether the output position A of the receive piece d is the next position X or not. When (Y) the output position A is the next position X, the processing of S205 is carried out, and when (N) the output position A is not the next position X, the processing of S206 is carried out.

(S205) The receive thread U directly writes the receive piece from the next position X of the output file 5 together with the sequential (one or more) pieces d in a lump when the sequential (one or more) pieces d, whose positions (A) are following that of the piece d, are stacked in the receive buffer 42. When one of the pieces d is stacked in the receive buffer 42, the receive piece d is only directly written to the file 5. The writing processing to the file 5 is performed by the file write thread U0. An example of the next position X is illustrated in FIG. 2.

(S206) The receive thread U stacks (accumulates) the receive pieces d in the receive buffer 42. At this point, one of the pieces d from the next position X exists on the receiver side (20), and thus the receive pieces d are not written to the file 5 but stacked on the receive buffer 42.

(S207) The receive module 20 receives all of the pieces d of the target file F by all of the receive threads U (U1 to Uu), and when receiving an "end" notification from the transmitter side (10) when the write to the output file F (5) is ended by T0, transmits a "completed" notification to the receiver side (10) at the end. Information of the transmission ID (f) etc. is attached to the "completed" notification. The receiver side (20) finishes the file output processing and changes the file name of the file F (5). That is, the receiver side (20) changes and determines the file name to one specified in the "end" notification by the transmitter side.

[Various Threads, Number of Threads]

As described above, on the transmitter side (10) and the receiver side (20), some kinds of threads are provided in the multi-thread configuration, respectively. In the following, the multi-thread configuration of the transmitter side (10) will be described. The concept is basically in the same manner as the receiver side (20).

On the transmitter side (10), as the multi-thread processing per individual file F transfer processing (transmission ID (f) unit), one file read thread T0, one monitor thread TM, and a plurality of (t) transmit threads T are activated. The file read thread T0 is activated so that the read processing of the data of the input file F (4) as the plurality of pieces d (d1 to dm) to the transmit buffer 41 is performed. Note that the reason of using single T0 is that file open processing of one thread generally takes a long time. If read data of a file is read by a plurality of threads, it takes a long time because file open processings for the number of threads are necessary. One feature of the present configuration is to perform the file data read processing (one time of open) by one file read thread T0 and to perform transmit processing of each piece by a plurality of transmit threads T.

On the receiver side (20), the component to write the file 5 (file write thread U0) exists being independent from the plurality of receive threads U, and the component (U0) performs the file output (write) processing. In this manner, the output of the file 5 is carried out by one component (U0), and thus the number of file open is one.

By the transmit threads T (T1 to Tt), data of the pieces d (d1 to dm) are read from the transmit buffer 41, respectively, and information {f, A, ... } is attached to perform the transmitting processing to the network 3.

The monitor thread TM is activated together with the transmit thread T and monitors the status of the transmit thread T. By controlling the monitor thread TM, in accordance with the transmission status, the number t of the transmit threads T is dynamically varied. This number of transmit threads t is determined in accordance with adjustment by the monitor thread TM etc. For example, at first (when starting the file transfer processing), the number of transmit threads t is set to a fixed number (t0). And, the number t is adjusted (increased and reduced) as necessary by the monitor thread TM with observing the status of network communication/transfer. For example, control is performed such that one or more transmit threads T are added when it is determined that processing performance is lacking; one or more transmit threads T are in a sleep mode when it is determined that the processing performance is too much; or one or more of the transmit threads T in the sleep mode are activated when it is determined that the processing performance is lacking. By suitably adjusting the number of transmit threads t, an improvement of processing efficiency etc. is achieved.

The number of divided pieces d "m" (or the size of divided piece (sd) etc.) and the number of transmit threads "t" are independent to each other and variable. For example, when m>t, the number of t pieces of the pieces d are first subjected to the transmitting processing by the transmit threads T1 to Tt, and when transmission of one of the pieces d by one of the threads T is finished, one piece d among the remaining number (m−t) of pieces d can be subjected to the transmitting processing next (multiple processing).

The present system can determine (adjust) efficiency of file transfer processing by the number of transmit threads T, basically. Actual transfer depends on the environment and state of the network 3 etc. and the communication efficiency largely differs depending on the state even in the same network 3. Also, for example, when the degree of multiple threads is too high, communication traffic in the network 3 is increased in reverse, and the communication efficiency is lowered. In addition, if the file transfer consumes network resources too much, it affects other processings.

In consideration of the foregoing, the control can be like the following. As the management/setting information of the present system, "target (goal) transfer traffic" (r), "piece size" (sd), "initial transmit thread number" (t0), etc. are set on the transmitter side (the values can be variably set). "Target transfer traffic" (r) is information defining how much bytes to be transferred in one second, for example.

The transmit thread number t upon starting the transfer is set as the initial transmit thread number t0 described above. Then, with confirming current transfer traffic etc. by the monitor thread TM described above, when the current transfer traffic exceeds the target transfer traffic r, one or more transfer threads T are for example put in a sleep mode to reduce the transmit thread number t. Also, when it is not reaching the target transfer traffic r, to increase the transfer thread number t, for example, when there is a transfer thread in the sleep mode, the thread in the sleep mode is activated, or one or more transfer threads T are newly added. In addition, when the transfer traffic is decreased in reverse even though the transfer threads T are increased, the transmit threads T are put in a sleep mode.

Note that, the file read thread T0 and the monitor thread TM in the transmit module 10 can be configured as separate functions (modules) being independent to the transmit thread T. The same goes to the receive module 20 (U0, UM).

[Transfer Processing of a Plurality of Files]

Further, the present modules (10, 20) have implementations (management functions 61, 62) capable of handling a situation of carrying out input/output (transfer) of the plurality of files F in the processes of the applications 31 and 32 simultaneously and in parallel.

An example is illustrated in FIG. 7. Input/output processing #1 (701) of a first file F1 (transmission ID: f1) and input/output processing #2 (702) of a second file F2 are carried out simultaneously and in parallel. Per file transfer processing unit (transmission ID), corresponding instance and/or buffer (41, 42) are allocated, respectively. These information items are managed by using, for example, the registration portions 12 and 22. By unifying the management of the information of R and W instances related to the transfer processing of a plurality of files, the entire of the input/output processing of the plurality of files in the processes of the applications 31 and 32 is grasped and suitably controlled.

[Buffer Limit Management]

A structure of limiting a size of each buffer (41, 42) by upper limit values x and y with using the upper-limit management portions 13 and 23 of the management functions 61 and 62 is provided. According to the limitation, suppression of resource consumption of the memories 51 and 52 etc. is achieved. The upper limit values x and y can be set as, for example, setting values per process unit of the applications 31 and 32, setting values per file F, or others. Also, for example, when the size of the target file F is larger than a normal one, it can be flexibly handled by changing the setting to have larger upper limit values.

[Burst Handling]

A situation (state) in which the piece d data amount stacked (accumulated) in the receive buffer 42 exceeds the upper limit value y is called "burst" in the present Specification. When the burst state occurs, from that time, every processing of the pieces d related to the file transfer processing are basically regarded to be in error (processing suspended, etc.). Then, handling processing is activated using the burst handling portions 14 and 24.

The burst may occur in accordance with the status of the network 3. For example, it is prone to occur when the transmitter side (10) does not recognize that the piece d data has been reached to the receiver side (20). To describe by the example in FIG. 2, for example, when the third piece d3 and the following are transmitted even though the second piece d2 has not yet reached to the receiver side (20), these piece groups are stacked in the receive buffer 42 and thus there is a possibility that the upper limit value y is exceeded due to the piece data amount.

The management functions 61 and 62 have the burst handling portions (continuing operation portions) 14 and 24 related to burst of file transfer. When burst occurs in file transfer processing of one transmission ID, by calling and carrying out the processing, continuing processing (reprocessing) from the error state (processing suspended) due to the burst related to the file transfer processing can be carried out. The continuing processing does not mean new file transmitting (transfer) processing but means processing of continuing and restarting processing being suspended in an incomplete state due to burst of the receiver side (20) etc.

There are continuing processings regarding the burst handling processing of the present embodiment as follows.

As a first example of continuing processing, when burst occurs on the receiver side (20), transfer processing of not-yet-outputted (unwritten) ones of the pieces d is carried out between the transmitter side (10) and the receiver side (20). It is exemplary illustrated in FIG. 7 and corresponds to processing of pieces d of s15. Also, unnecessary instance corresponding to the burst is deleted.

The receive module 20 (24) once establishes the piece d data, which has been already normally outputted (written) to the output file 5 by that time, as a file. Stacked pieces d, unreached pieces d, and piece d data of burst (exceeding the upper limit value y) are ignored or deleted.

The receiver side (20) notifies the transmitter side (10) a request (instruction) of continuing processing by the burst handling portion 24. The burst handling portion 14 of the transmitter side (10) follows the request and carries out continuing processing for the burst handling.

The transmitter side (10) carries out transmitting processing of piece d data corresponding to shortfall (other than those established, i.e., those after the next position X) in the same manner as the multi-thread processing at the initial start as described above. In the continuing processing, a retry processing (resend processing) of transfer per piece d in a normal state can be used.

Specifically, in the example in FIG. 7, regarding the file input/output processing #2 (702), when burst occurs, the s11 illustrates pieces d1 to di and processing thereof for pieces which have been already directly written to the output file 5 (next position X). s12 illustrates a piece dx which has not been reached to the receiver side (20) due to error etc. on the network 3 and processing thereof. s13 illustrates pieces dj to dk which has been normally stacked within the upper limit value y. s14 illustrates pieces d1 to dm for burst exceeded the upper limit value y of the receive buffer 42 and processing thereof.

s15 illustrates a first example of handling processing (continuing processing). There, the pieces dj to dk of s13 are ignored and pieces from dx to dm of s12 are subjected to transfer processing.

The example of the continuing processing of the transmitter side is as follows. The transmitter side (10) uses the same transmission ID (f) as that of the processing suspended by burst, and carries out existence confirmation of the target file F to the receiver side (20). The receiver side (20) sends a response of information such as position, size, etc. indicating that to which piece d data the data has been already written (established) to the transmitter side (10) when the file F of the transmission ID (f) to be a target of existence confirmation from the transmitter side (10) exists. To this, the transmitter side (10) skips processing of the piece d by a size of the already-written pieces in the receiver side (20), and starts reading/transmitting processing of the pieces d of the file from the next position X in the same manner described above.

As an example of a second continuing processing, the piece d data which has been normally received (stacked) in the receive buffer 42 at the time of burst is once outputted and established as a file to empty out the receive buffer 42 region. That is, the piece d data is retained in the receive buffer 42 still or saved as a file (separate from the file 5) and the state of the receive buffer 42 at the moment. The receive module 20 (24) ignores or deletes the piece d data for the burst (exceeding the upper limit value y).

More specifically, in the example of FIG. 7, s16 illustrates a second example of handling processing (continuing processing). The pieces dj to dk, which have been normally stacked within the upper limit value y of the receive buffer 42 of s13, are retained still, or saved as another file. And, the pieces d1 to dm of s14 and the piece dx of s12 are subjected to transfer processing.

[Retry and Retransmission]

The receiver side (20, receive thread U) can request (instruct) retry of transmission of necessary pieces d to the transmitter side (10, transmit thread T) by recognizing reached/unreached states of the piece d data. In this case, the transmitter side (10) retransmits the piece d data corresponding to retry request from the receiver side (20). In this manner, also upon burst, the receiver side (20) can transfer lacked piece d data (for example, pieces d of the next position X and the following in FIG. 7).

The transmitter side (10), when receiving a retry request from the receiver side (20) as communication error etc. occur in transmission of the piece d data, retransmits the piece d data. When the receiver side (20) receives the pieces d data retransmitted from the transmitter side (10), the receiver side (20) ignores the corresponding pieces d which has been already retrieved and uses pieces d newly retrieved in the transmission.

Also, when receiving an "end" notification from the transmitter side (10), the receiver side (20) can determine that there are unreached pieces d from the transmitter side (10) when output of all the pieces d to the file 5 has not been ended on the receiver side (20). In this manner, the receiver side (20) and the transmitter side (10) carry out processing by retransmission of unreached piece d data etc. in the same manner as the situation of burst.

[Delete of Unnecessary Instance and Receive Buffer Clear]

Also, together with the processing described above, by using the management functions 61 and 62, processing as described below can be performed. First, as unnecessary instance deletion processing, the receive thread U (corresponding W instance) associated to pieces d of burst is deleted as unnecessary instance.

For example, when an error occurs on the transmitter computer 1 and/or the network 3, processing buffer data (receive buffer 42 and piece d data in a stacked state) related to suspended file transfer and the file F (5) in the midst of output processing remain on the receiver side (20). In the unnecessary instance deleting processing, processing of deleting the data/information remaining after a certain period of time is carried out.

Also, as buffer clear processing, upon clear of the receive buffer 42 in the burst handling, all piece data related to the transfer of the files which have been already stacked in the receive buffer 42 is deleted (example of the first continuing processing).

<Effects Etc.>

As described above, according to the present embodiment, the configuration, which relates to transfer (input/output) of the file F between computers (1, 2) on the network 3 (the Internet), of particularly performing processing dividing the file F into a plurality of pieces (pieces d) by multi-thread processing and transferring the same even when a size of the target file F is large can improve processing efficiency as a whole.

In the foregoing, the invention made by the inventor of the present invention has been concretely described based on the embodiments. However, it is needless to say that the present invention is not limited to the foregoing embodiments and various modifications and alterations can be made within the scope of the present invention.

The present invention can be used in an information processing system on the Internet and so forth.

What is claimed is:

1. A multi-thread file input/output system performing input and output of files between first and second computers on a network, the system comprises:

a first module performing processing of reading data from a file of an input source, dividing the data, and transmitting the data as a plurality of pieces to the network by multi-thread processing in the first computer on a side transmitting the file; and a second module performing processing of receiving the plurality of pieces from the network, integrating and writing the plurality of pieces to a file of an output destination by multi-thread processing in the second computer on a side of receiving the file, the first module processing transmission of each of the plurality of pieces after the division by each of a plurality of transmit threads to be allocated, the second module processing transmission of each of the plurality of pieces after the division by each of a plurality of receive threads to be allocated, the first module attaching an ID of transmission of the file and information of a relative position from a head position of the file to a piece to be transmitted, and the second module performing writing processing from head positions of the plurality of pieces to a file of the output destination while confirming relative positions of received pieces and a state indicating to which relative position the pieces have been already written in order from a head position of a file of the output destination, and also accumulating the receive pieces to a receive buffer in the second computer as necessary.

2. The multi-thread file input/output system according to claim 1, wherein, with confirming a relative position of a received piece and a next position indicating a relative position to write next in the file of the output destination, each of the receive threads in the second module accumulates the receive piece in a receive buffer in the second computer when the receive piece is not corresponding to the next position; and when the receive piece is corresponding to the next position, each of the receive threads in the second module performs processing of writing the receive piece from the next position of the file of the output destination, the receive piece being written together with a following piece when there is one or more following pieces in order of the relative positions to accumulate in the receive buffer.

3. The multi-thread file input/output system according to claim 1, wherein the first module activates one file read thread reading and dividing data of the file of the input source by a predetermined size or number and performing processing of storing the data as the plurality of pieces to a transmit buffer in the first computer; and the second module activates one file write thread performing writing processing of the plurality of pieces as sequential data to the file of the output destination in order from a head position.

4. The multi-thread file input/output system according to claim 1, wherein the first module activates one monitor thread monitoring statuses of the plurality of transmit threads and adjusting a number of the transmit threads; and the second module activates one monitor thread monitoring statuses of the plurality of receive threads and adjusting a number of the receive threads.

5. The multi-thread file input/output system according to claim 1, wherein the second module has a function of allocating the receive buffer in a physical memory in the second computer and limiting a size of the receive buffer by an upper limit value being set.

6. The multi-thread file input/output system according to claim 1, wherein the second module is put into a burst state when a data traffic of data to be accumulated in the receive buffer exceeds a size of the receive buffer; and, as continuing processing for handling the burst, the first and second modules have functions of performing transfer processing regarding pieces following pieces already written to the file of the output destination that relates to the file transfer.

7. The multi-thread file input/output system according to claim 1, wherein a first application program of the first computer sends a request of read and transmit processing of a first file to the first module and the first module creates a first instance for processing of the first file in response to the request; and a second application program of the second computer sends a request of receive and transmit processing of the first file to the second module and the second module creates a second instance for processing of the first file in response to the request, thereby enabling transfer processing of a plurality of files in a simultaneous and parallel manner by the configuration.

8. A non-transitory computer-readable medium encoded with a computer program executing processing of input/output of a file between first and second computers, the program comprising:

a first program performing processing of reading data from a file of an input source, dividing the data, and transmitting the data as a plurality of pieces to the network by multi-thread processing in the first computer on a side transmitting the file; and a second program performing processing of receiving the plurality of pieces from the network, integrating and writing the plurality of pieces to a file of an output destination by multi-thread processing in the second computer on a side of receiving the file, the first program processing transmission of each of the plurality of pieces after the division by each of a plurality of transmit threads to be allocated, the second program processing transmission of each of the plurality of pieces after the division by each of a plurality of receive threads to be allocated, the first program attaching an ID of transmission of the file and information of a relative position from a head position of the file to a piece to be transmitted, and the second program performing writing processing from head positions of the plurality of pieces to a file of the output destination while confirming relative positions of received pieces and a state indicating to which relative position the pieces have been already written in order from a head position of a file of the output destination, and also accumulating the receive pieces to a receive buffer in the second computer as necessary.

* * * * *